(12) United States Patent
Jones et al.

(10) Patent No.: US 7,366,978 B1
(45) Date of Patent: Apr. 29, 2008

(54) METHOD AND SYSTEM FOR CREATING A GRID-LIKE COORDINATE SYSTEM FOR ADDRESSING DATA CONTAINED IN AN IRREGULAR COMPUTER-GENERATED TABLE

(75) Inventors: Brian Jones, Redmond, WA (US); Robert Little, Redmond, WA (US); Marcin Sawicki, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 224 days.

(21) Appl. No.: 10/366,109

(22) Filed: Feb. 13, 2003

(51) Int. Cl.
*G06F 15/00* (2006.01)
*G06F 17/00* (2006.01)

(52) U.S. Cl. .................... 715/509; 715/504
(58) Field of Classification Search ............... 715/509, 715/504
See application file for complete search history.

(56) References Cited

U.S. PATENT DOCUMENTS

| | | | | |
|---|---|---|---|---|
| 4,802,673 A * | 2/1989 | Patel | ................ | 273/153 S |
| 5,272,628 A * | 12/1993 | Koss | ................ | 715/503 |
| 5,317,680 A * | 5/1994 | Ditter, Jr. | ................ | 345/630 |
| 5,450,536 A * | 9/1995 | Rosenberg et al. | ......... | 715/509 |
| 5,555,352 A * | 9/1996 | Lucas | ................ | 345/423 |
| 5,557,787 A * | 9/1996 | Shin et al. | ................ | 707/102 |
| 5,588,099 A * | 12/1996 | Mogilevsky et al. | ........ | 715/508 |
| 5,636,297 A * | 6/1997 | Eller et al. | ................ | 382/293 |
| 5,768,606 A * | 6/1998 | Sharp | ................ | 715/509 |
| 5,774,584 A * | 6/1998 | Matsumoto et al. | ......... | 382/194 |
| 5,835,916 A * | 11/1998 | Inaki et al. | ................ | 715/509 |
| 5,873,106 A * | 2/1999 | Joseph | ................ | 715/506 |
| 5,907,630 A * | 5/1999 | Naoi et al. | ................ | 382/173 |
| 5,933,833 A * | 8/1999 | Musashi | ................ | 707/102 |
| 6,044,383 A * | 3/2000 | Suzuki et al. | ................ | 715/509 |
| 6,088,708 A * | 7/2000 | Burch et al. | ................ | 707/509 |
| 6,112,216 A * | 8/2000 | Pratley et al. | ............. | 715/509 |
| 6,144,974 A * | 11/2000 | Gartland | ................ | 715/517 |
| 6,336,124 B1 * | 1/2002 | Alam et al. | ................ | 715/523 |
| 6,374,273 B1 * | 4/2002 | Webster | ................ | 715/513 |
| 6,415,305 B1 * | 7/2002 | Agrawal et al. | ............ | 715/503 |
| 6,613,098 B1 * | 9/2003 | Sorge et al. | ................ | 715/513 |
| 6,639,611 B1 * | 10/2003 | Leduc | ................ | 715/764 |
| 6,678,865 B1 * | 1/2004 | Pratley et al. | ............. | 715/509 |
| 6,747,643 B2 * | 6/2004 | Happel | ................ | 345/419 |

(Continued)

OTHER PUBLICATIONS

Anderson, Richard J., et al., "The Table Layout Problem", SCG '99, Miami Beach, FL, Jun. 1999, pp. 115-123 [ACM 1-58113-068-6/99/06].*

(Continued)

*Primary Examiner*—Shahid Alam
*Assistant Examiner*—Robert Stevens
(74) *Attorney, Agent, or Firm*—Merchant & Gould P.C.

(57) ABSTRACT

Methods and systems provide for imposing structure onto a freeform or irregular table so that a subsequent consuming application may use the table, including presentation of the table and location of the data in the table. A generic grid structure is created having a plurality of uniformly-shaped cells such that if the generic grid is overlaid onto the irregular table, each cell within the irregular table may be located based on its position relative to the uniform cells or grids. The grid structure creates a coordinate system for defining the shape of the irregular table, for defining locations and shapes of cells comprising the irregular table and for addressing the locations of data contained in the irregular table.

15 Claims, 5 Drawing Sheets

U.S. PATENT DOCUMENTS

| | | | |
|---|---|---|---|
| 6,816,170 B1* | 11/2004 | Udeshi | 345/660 |
| 6,822,663 B2* | 11/2004 | Wang et al. | 715/854 |
| 7,002,571 B2* | 2/2006 | Lake et al. | 345/420 |
| 2001/0049699 A1* | 12/2001 | Pratley et al. | 707/503 |
| 2002/0124016 A1 | 9/2002 | Rank et al. | 707/503 |
| 2003/0005410 A1 | 1/2003 | Harless | 717/114 |
| 2003/0028560 A1* | 2/2003 | Kudrolli et al. | 707/509 |
| 2004/0015834 A1* | 1/2004 | Mestre et al. | 717/106 |
| 2004/0153449 A1 | 8/2004 | Bettendorf | 707/5 |
| 2004/0205452 A1* | 10/2004 | Fitzsimons et al. | 715/500 |
| 2005/0091231 A1 | 4/2005 | Pal et al. | 707/100 |

OTHER PUBLICATIONS

Okubo, Tsuneo, et al., "New Algorithm for Overlapping Cell Treatment in Hierarchical CAD Data / Electron Beam Exposure Data Conversion", 27th ACM/IEEE Design Automation Conference, © 1990, pp. 321-326 [IEEE 0738-100X/90/0006/0321].*

Villard, Lionel, et al., "An Incremental XSLT Transformation Processor XML Documentation Manipulation", WWW '02, Honolulu, HI, May 7-11, 2002, pp. 474-485 [ACM 1-58113-449-5/02/0005].*

Microsoft Computer Dictionary, 5th Edition, Microsoft Press, Redmond, WA, © 2002, pp. 129-130, 516 and 580.*

Parker, Sybil P. (ed.), McGraw-Hill Dictionary of Scientific and Technical Terms, 5th Edition, McGraw-Hill, Inc., New York, NY, © 1994, p. 2006.*

Microsoft Press Computer Dictionary, 3rd Edition, Microsoft Press, Redmond, WA, © 1997, p. 367.*

Zuyev, Peter, et al., "Table Image Segmentation", Proceedings of the 4th Int'l Conf. on Document Analysis and Recognition, vol. 2, Aug. 18-20, 1997, pp. 705-708.*

North, Simon, et al., Sam's Teach Yourself XML in 21 Days, Sam's Publishing, Indianapolis, IN, Mar. 1999, pp. 13-18.*

Raviv, Alon, et al., "Three Dimensional Freeform Sculpting via Zero Sets of Scalar Trivariate Functions", Fifth Symposium on Solid Modeling, Ann Arbor, MI, Jun. 1999, pp. 246-257.*

Samet, Hanan, "Hierarchical Representations of Collections of Small Rectangles", ACM Computing Surveys, vol. 20, No. 4, Dec. 1988, pp. 271-309.*

Ayani, Rassul, et al., "Optimizing Cell-Size in Grid-Based DDM", 0-7695-0677-1/00 © IEEE 2000, pp. 93-100.*

Nagy, George, et al., "Approximation of Polygonal Maps by Cellular Maps", Communications of the ACM, vol. 22, No. 9, Sep. 1979, pp. 518-525.*

Samet, Hanan, "The Quadtree and Related Hierarchical Data Structures", ACM Computing Surveys, vol. 16, No. 2, Jun. 1984, pp. 187-260.*

Anderson, Richard J., et al., "The Table Layout Problem," SCG '99, Miami Beach, FL, Jun. 1999, pp. 115-123 [ACM 1-58113-068-6/99/06].

Okubo, Tsuneo, et al., "New Algorithm for Overlapping Cell Treatment in Hierarchical CAD Data / Electron Beam Exposure Data Conversion", 27th ACM/IEEE Design Automation Conference, © 1990, pp. 321-326 [IEEE 0738-100X/90/0006/0321].

Villard, Lionel, et al., "An International XSLT Transformation Processor XML Documentation Manipulation", WWW '02, Honolulu, HI, May 7-11, 2002, pp. 474-485 [ACM 1-58113-449-5/02/0005].

Microsoft Computer Dictionary, 5th Edition, Microsoft Press, Redmond, WA, © 2002, pp. 129-130, 516 and 580.

Parker, Sybil P. (ed.), McGraw-Hill Dictionary of Scientific and Technical Terms, 5th Edition, McGraw-Hill, Inc., New York, NY, © 1994, p. 2006.

Microsoft Press Computer Dictionary, 3rd Edition, Microsoft Press, Redmond, WA, © 1997, p. 367.

Featuring Adobe FrameMaker 6.0, Adobe Systems Incorporated, © 2000.

\* cited by examiner

METHOD AND SYSTEM FOR CREATING A GRID-LIKE COORDINATE SYSTEM FOR ADDRESSING DATA CONTAINED IN AN IRREGULAR COMPUTER-GENERATED TABLE

FIELD OF THE INVENTION

The present invention relates to methods and systems for creating a grid-like coordinate system for addressing data contained in an irregular computer-generated table.

BACKGROUND OF THE INVENTION

Computer software applications allow users to create a variety of documents to assist them in work, education, and leisure. For example, word processing applications allow users to create letters, articles, books, memoranda and the like. Spreadsheet applications allow users to store, manipulate, calculate, print, and display a variety of alphanumeric data. Such applications have a number of well-known strengths including rich editing, formatting, printing and calculation.

Recently, markup languages such as hypertext markup language (HTML) and Extensible Markup Language (XML) have been developed for placing data into a format that may be consumed by a variety of different types of applications. HTML is used primarily for formatting data for publication on Internet-based web pages. Extensible markup language (XML) has been developed for applying structure to data to allow the data to be consumed by a variety of other applications. For example, a document prepared with a word processing application may be saved in an XML format, and a spreadsheet application, for example, may subsequently open the XML formatted document for presentation to a user via the spreadsheet application. One markup language may also be transformed into another markup language where the second markup language is required by a consuming application. For example, XML markup may be transformed into HTML for viewing the transformed data using a Web browser. A common way of transforming XML markup into HTML is by using Extensible Stylesheet Language Transformations (XSLT) files that may be used to define how a given XML markup should be converted into HTML.

Often users of word processing applications construct irregular tables for presenting data, text and/or images. For example, an irregular table may be a table comprised of two rows where each row is broken into a number of cells of varying widths causing the overall table shape to lack definitive Cell Columns. Unfortunately, if the user creates such an irregular table and then desires to save the document using a markup language like XML that will at some point be transformed into HTML, then there can be virtually no way of defining the XSLT transform file that will convert that XML file into HTML that would result in a correct rendering of that table in the browser or the application supporting that particular markup language. For example, if a word processing document is used to create an irregular table containing numerical data and it is subsequently saved as an XML-formatted document, and that document is subsequently transformed into HTML using an XSLT transform file for display using a web browser, for example, the XML markup of the document during the saving process has no way of describing the exact positions of the table cells within the irregular table so that the table can be easily expressed as HTML and viewed in the browser without losing its original layout. Consequently, there is no easy way to use the XSLT transform file to display the XML-described table in an HTML-based browser the same way it was displayed by the creating application.

It is with respect to these and other considerations that the present invention has been made.

SUMMARY OF THE INVENTION

Embodiments of the present invention provide methods and systems for imposing structure onto a freeform or irregular table so that a subsequent consuming application may use the table, including presentation of the table and location of the data in the table. A user of a computer-generated document such as a word processing document prepares an irregular table. Once the irregular table is prepared, controls, images, text, or other data are inserted into a plurality of cells within the irregular table. After the irregular table is prepared and completed, the document is saved in the format of a markup language such as XML. During the process of saving the document by the application, all edges of each cell in the irregular table are located. Beginning at a starting position at the uppermost and leftmost position of the irregular table, each cell edge is defined based on its position relative to the starting position. Next, a generic grid structure (hereafter grid) is created having a plurality of cells such that if the generic grid is overlaid onto the irregular table, each cell within the irregular table may be located based on its position relative to the cells or grids of the generic grid structure. Once the grid is calculated, for the markup used to represent the table it is output in such a way that makes all cell sizes and locations within the table expressed in terms of the cells of the generic grid structure. The grid structure creates a coordinate system for defining the shape of the irregular table for defining locations and shapes of cells comprising the irregular table and for addressing the locations of data contained in the irregular table.

These and other features, advantages and aspects of the present invention may be more clearly understood and appreciated from a review of the following detailed description of the disclosed embodiments and by reference to the appended drawings and claims.

DETAILED DESCRIPTION

The following description of embodiments of the present invention is made with reference to the above-described drawings wherein like numerals refer to like parts or components throughout the several figures. The present invention is directed to a method and system for imposing a grid-like structure on a freeform or irregular table so that a consuming application may locate and address data contained in the irregular table.

Operating Environment

Figure 1:
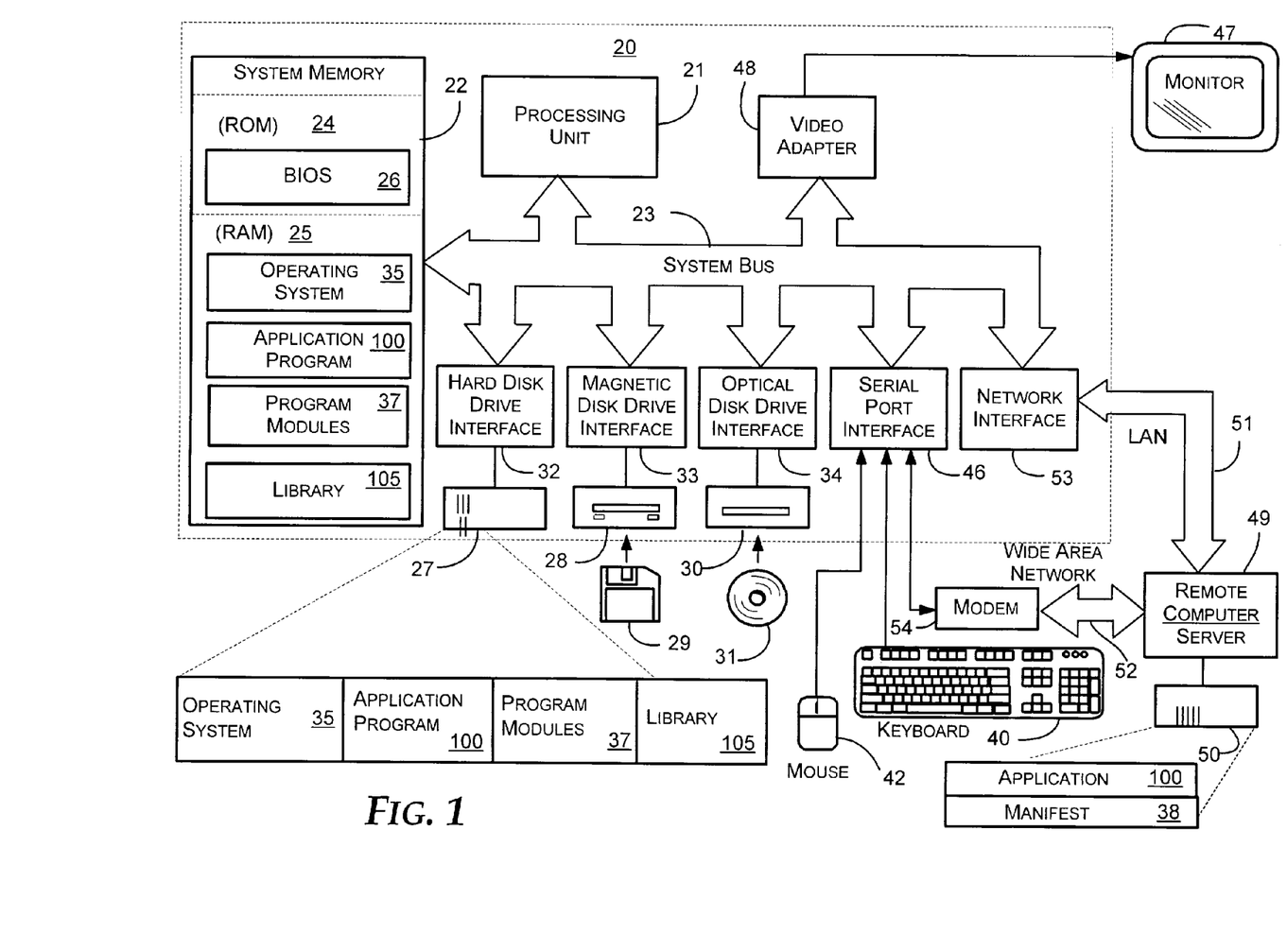
FIG. 1 is a block diagram of a computer and associated peripheral and networked devices that provide an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, a word processor program module 37 (or other type of program module), program data, such as the manifest 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Operation

Figure 2:
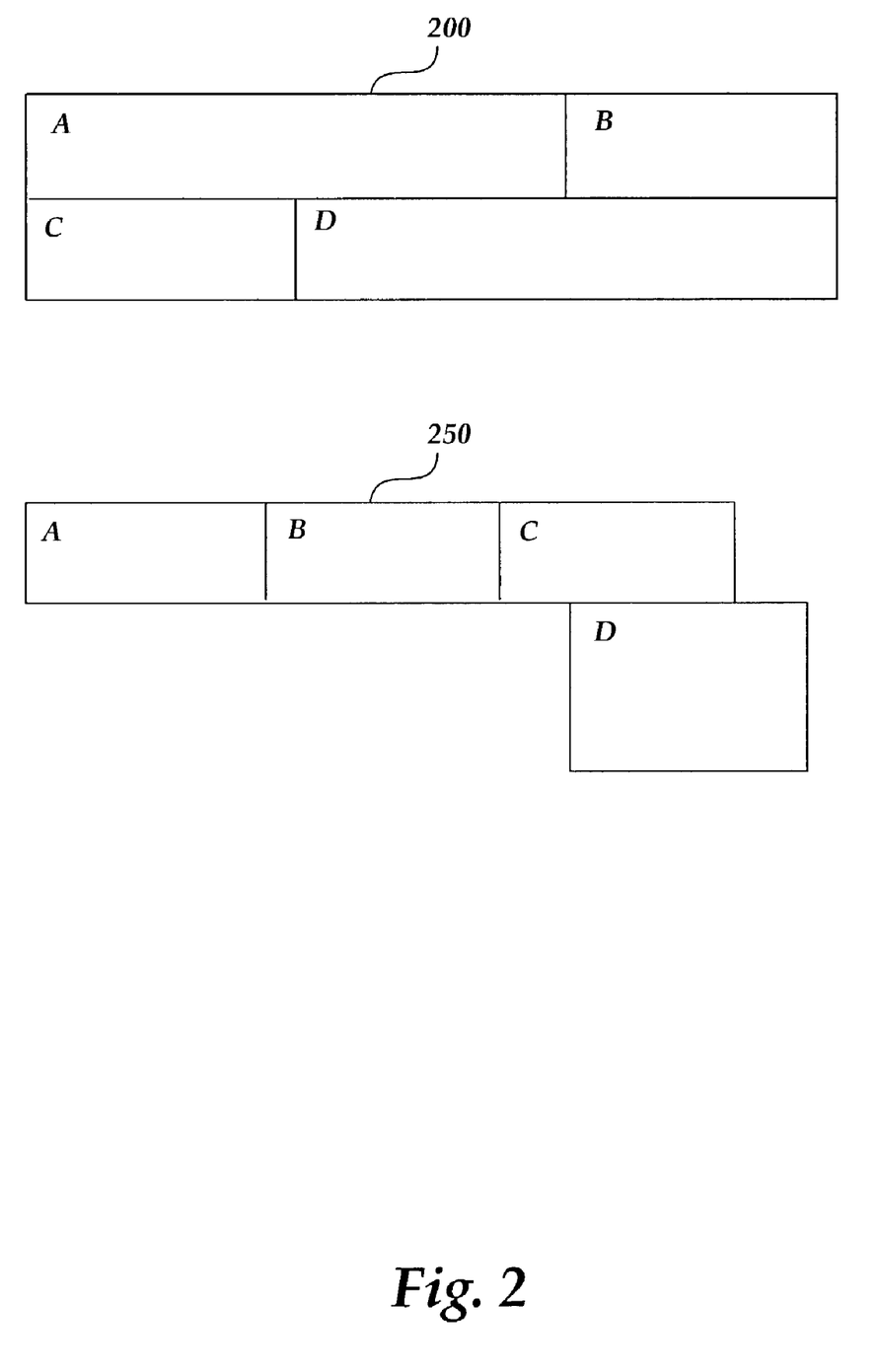
FIG. 2 illustrates a simplified block diagram of two irregular computer-generated tables.

FIG. 2 illustrates a simplified block diagram of two irregular computer-generated tables. An example irregular table 200 is comprised of Cell A, Cell B, Cell C and Cell D. Cell A in row 1 of table 200 is approximately twice the length of Cell B in row 1, and Cell C in row 2 is approximately half the length of Cell A located immediately above Cell C in row 1. Because the table is irregular, it is difficult to define the address of text or data located inside any of the described cells. The table 250 is comprised of Cell A, Cell B, Cell C and Cell D. Cell D appears to be separate from Cells A, B and C and bears no particular relation to those cells in terms of size or placement.

Figure 3:
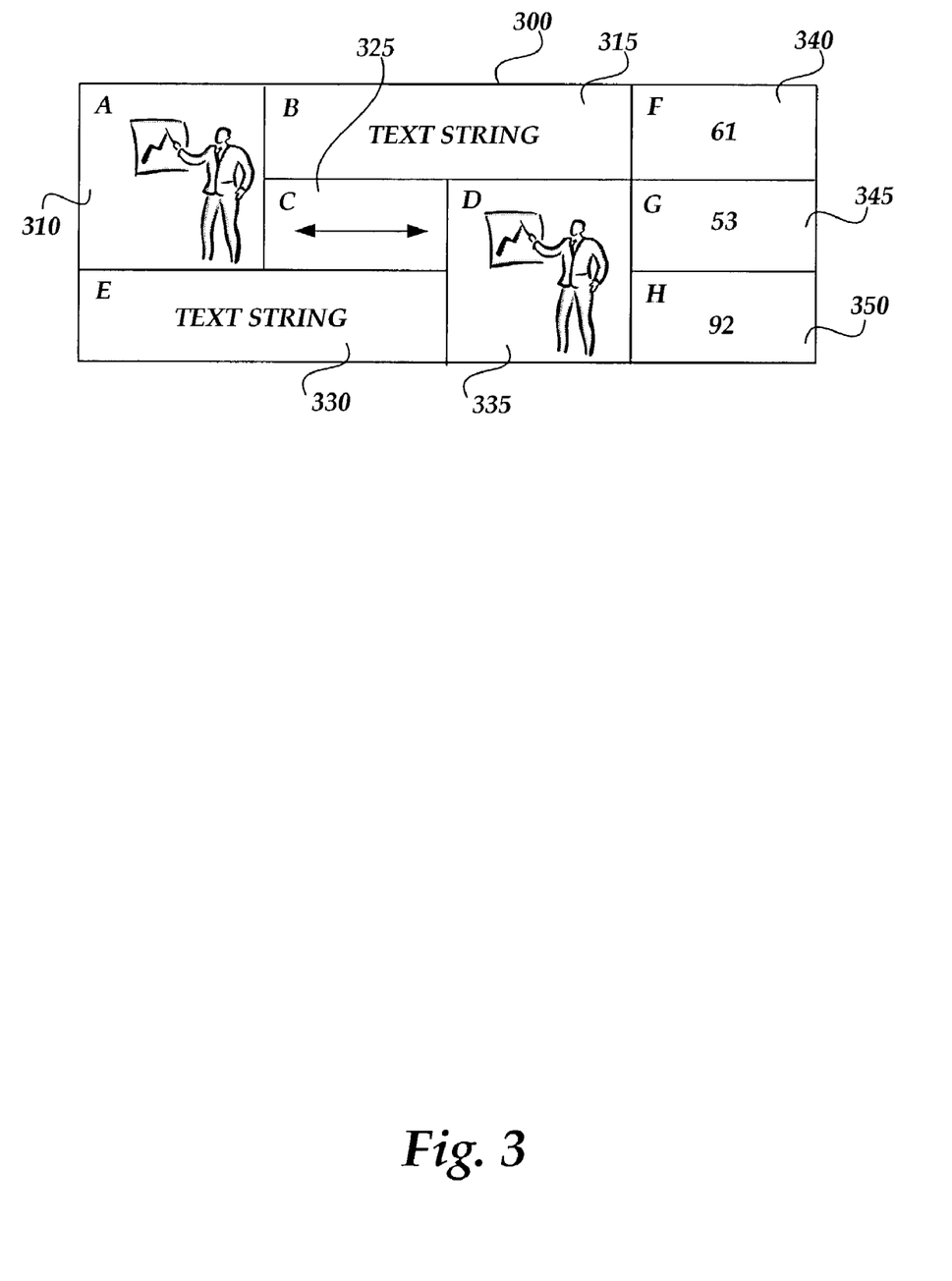
FIG. 3 illustrates a simplified block diagram of an irregular table containing graphical images, text strings, and numerical data.

FIG. 3 illustrates a simplified block diagram of an irregular table containing graphical images, text strings, and numerical data. The irregular table is illustrated containing a plurality of text strings, images and data entries. For example, Cell A and Cell B contain graphical images. Cells B and E contain text strings, Cell C contains a graphical image, and Cells F, G, and H contain numerical data entries.

As briefly described above, often users prepare an irregular table such as the tables illustrated in FIGS. 2 and 3 using a word processing application in order to assemble various pieces of data, images or text such as is illustrated in FIG. 3. In order to transform the word processing document into a format that is consumable by other applications such as web browsers and spreadsheet applications, it is advantageous to transform documents, including those containing irregular tables such as FIGS. 2 and 3 into a markup language such as hypertext markup language (HTML) or Extensible Markup Language (XML). For example, as is well known to those skilled in the art, most documents published by web browsers are published as HTML documents. In order to convert a document for consumption by a variety of other applications, such as spreadsheet applications, it is advantageous to convert the documents into XML. Subsequently, in order to publish the documents to an Internet-based web page, the spreadsheet documents must then be converted into HTML before publication by a web browser.

Unfortunately, conversion of the original word processing application containing the irregular table into XML for consumption by other applications such as HTML is difficult because during the XML conversion process it is difficult to define the shapes of the irregular tables and to define the locations in the irregular table of the various data entries. For example, if table 250, FIG. 2, is transformed into a markup language such as HTML for display using a web browser, HTML will be unable to define the second row without attempting to include a second row comprised of cells without boundaries. Referring to the irregular table illustrated in FIG. 3, if the table is converted from a word processing document into an XML document for consumption by a spreadsheet application without the ability to define the locations of the data entries contained in the irregular table 300 it is difficult if not impossible for the spreadsheet application to locate data entries in the table in order to operate on those data entries. For example, if the entries contained in the Cells F, G and H of the table 300 represent data required by a spreadsheet equation, the spreadsheet application will have no point of reference for locating the data in those cells. That is, Cell F is the third cell in the first row, but Cell G also appears to be in the first row in relation to Cell A, but Cell G is clearly in a row beneath Cell F. Likewise, Cell H appears to be in a third row from Cell F, but appears to be in a second row in relation to Cell H as compared to Cell E. Additionally, Cell F appears to be the third cell in the first row, and Cell H appears to be the second cell in the third row because cell D would be defined in the second row instead of the third row. Cells F and H are both in the same column and likely contain related data.

Figure 4:
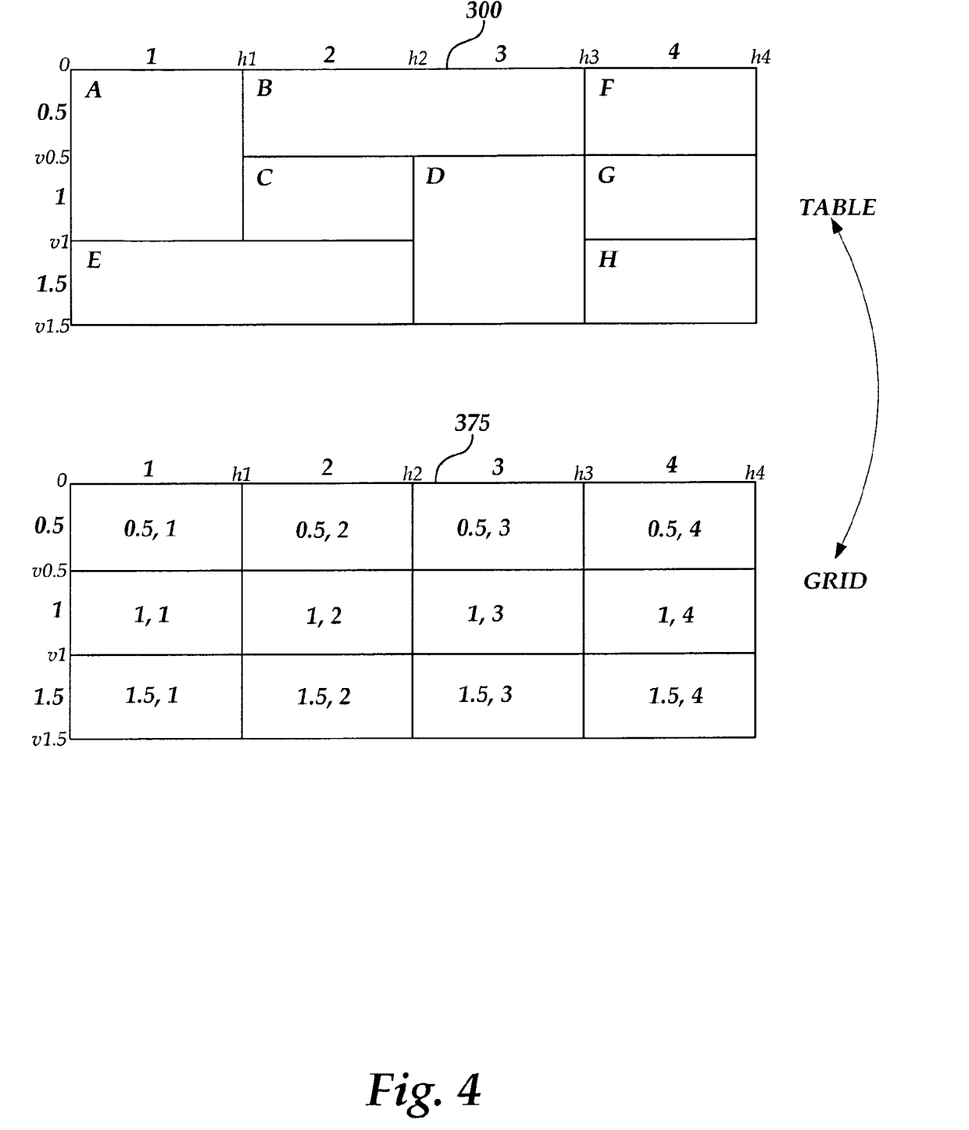
FIG. 4 is a simplified block diagram of the irregular table of FIG. 3 and a generic grid-like structure for overlaying the irregular table for defining the shape of the table and for addressing data contained therein.

Referring now to FIG. 4, the irregular table 300 of FIG. 3 is illustrated immediately above a grid structure 375. As described above, the irregular table 300 is comprised of a plurality of cells of different shapes and locations making the location of data contained therein difficult, particularly after conversion of the table from one programming language to a second programming language to allow the table to be consumed by a second application. In accordance with the embodiment of the present invention, the grid 375 is calculated so that it may be superimposed over the irregular table 300 in order to provide a coordinate system for locating data contained in the cells of the irregular table 300. As shown in FIG. 4, the grid structure 375 is calculated to precisely overlay the outermost parameter of the irregular table 300 and is comprised of individual grid cells that may be used to define the shape or the table and the locations of data entries contained in the plurality of cells comprising the irregular table 300. For example, as shown in FIG. 4, by superimposing the grid 375 over the irregular table 300, it could be seen that the contents of Cell A of the irregular table 300 may be defined by the two cells having coordinates 0.5, 1 and 1, 1 of the grid 375. Likewise, the contents of Cell B of table 300 may be defined by the grid cells having coordinates 0.5, 2 and 0.5, 3. Accordingly, if a spreadsheet application, for example, requires the data entries contained in Cells F, G and H of the table 300, the data entries may be found by locating the grid cells having coordinates 0.5, 4, 1, 4, and 1.5, 4, respectively.

Figure 5:
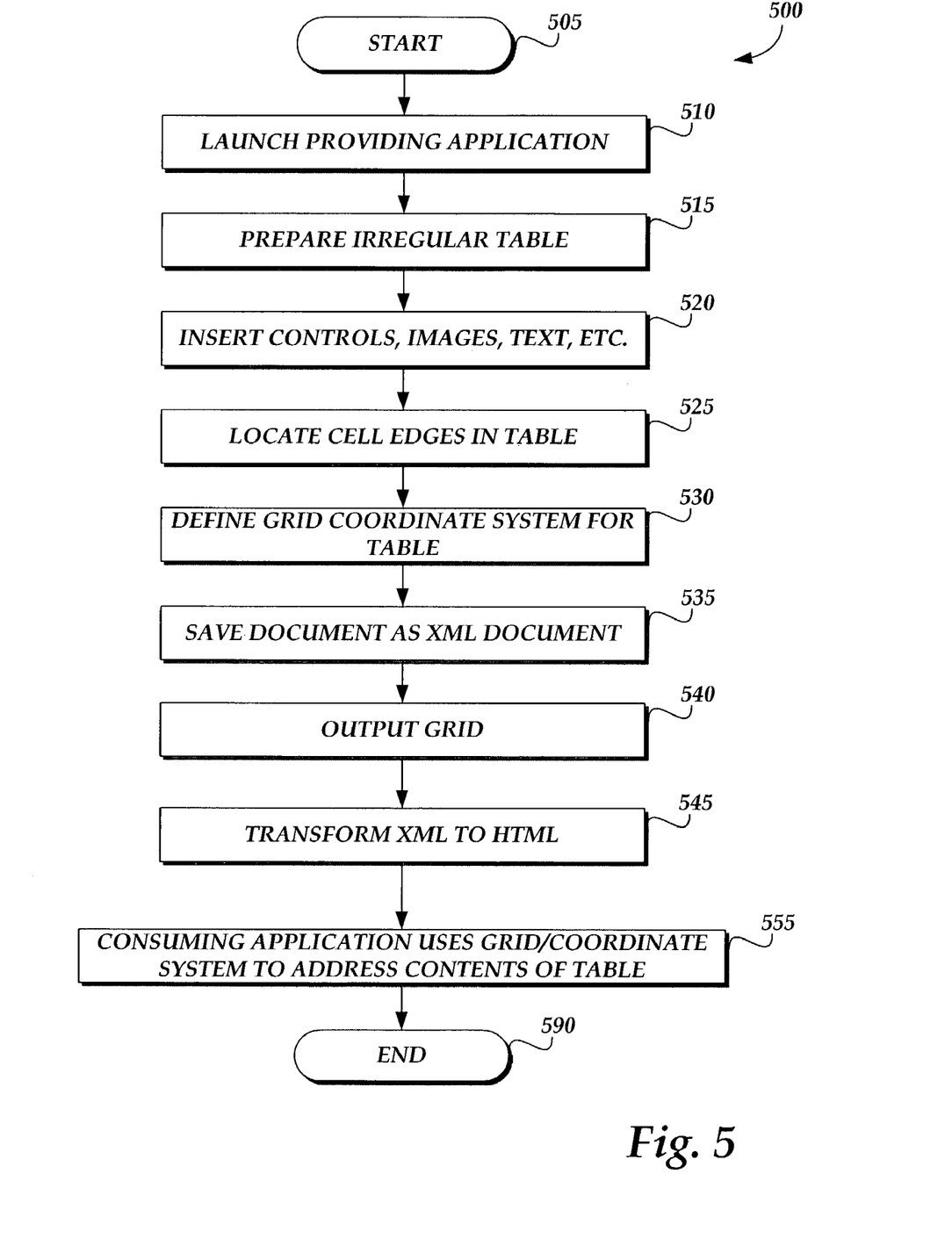
FIG. 5 is a flow chart illustrating a method for creating a coordinate system from a grid-like structure for superimposing onto an irregular or freeform table for allowing a consuming application to define the table and to locate data contained in the irregular table.

FIG. 5 is a flow chart illustrating a method for creating a coordinate system from a grid-like structure for superimposing onto an irregular or freeform table for allowing a consuming application to display the irregular table as the table was created by the providing application. The method 500 begins at start step 505 and proceeds to step 510 where a providing application is launched for preparing an irregular table, as described above with reference to FIGS. 2, 3 and 4. As should be understood by those skilled in the art, the providing application may be a word processing application, a spreadsheet application, a text editing application, and the like. Although the present invention is described with respect to operation of the functionality of the present invention with respect to irregular tables, it should be understood that the functionality of the present invention is readily useful with respect to regular-shaped tables. At step 515, an irregular table such as table 300, illustrated in FIGS. 3 and 4, is prepared using the providing application. At step 520, a variety of controls, images, text, and data entries such as those illustrated in FIG. 3 are entered into a plurality of cells in the irregular table.

At step 525, calculation of the grid structure 375 is started. The cell edges of the cells contained within the irregular table are located. For example, referring to the table 300 shown in FIG. 4, the first edge of the Cell A is located at position 0 along the horizontal side, the second edge of Cell A is located at position h1 along the horizontal side. The first edges of Cells B and C are also located at position h1 along the horizontal side, and the second edge of Cells C and E and the first edge of Cell D are located at position h2 along the horizontal side. The first edges of Cells F, G, and H are located at position h3 along the horizontal side, and the second edges of Cells F, G and H are located at position h4 along the horizontal side. The upper edge of Cells A, B and F are located at position 0 along the vertical side. The lower edge of Cell B and Cell F and the upper edge of Cells C, D and G are all located along position v0.5 along the vertical side. The lower edges of Cells A, C and G and the upper edges of Cells E and H are located along position v1 along the vertical side. The lower edges of Cells E, D and H are located along position v1.5 along the vertical side.

At step 530, the horizontal and vertical edges determined at step 525 are used to define a grid structure 375, as illustrated in FIG. 4. That is, a grid is defined according to the positions (both horizontal and vertical) of the table cell edges. The grid structure is defined as a set of uniformly-shaped grid cells, where the size of a grid cell is equal to the smallest table cell. Once the grid structure 375 is calculated the cells of the original table are then mapped into the grid by locating each table cell based on the uppermost and leftmost position of the table cell in the grid structure and by defining the table cell size based on the number of grid cells high and wide each table cell comprises. For example, Cell B of table 300 begins at vertical position 0, horizontal position h1 and is one grid cell high and two grid cells wide. Utilizing the position and size of the table cells as defined, a coordinate system is created that may be used to locate data contained within the cells comprising the irregular table 300. For example, data contained in Cell A of the table 300 may be located at grid cell 0.5, 1 and 1, 1. Data contained in Cell F of table 300 may be located at grid cell 0.5, 4, and data contained in Cell H of the table 300 may be found at grid cell 1.5, 4. Thus, the data from the irregular table is mapped to the grid to allow an XSLT transform file, for example, to transform the document (including the table) into HTML for display by a web browser.

At step 535, the document containing the irregular table is saved as an XML document so that the document may be consumed by a separate application such as a spreadsheet application. It should be understood that if the document is saved in an XML format but is subsequently opened by the same providing application as originally created the document, the data of the document may be transformed back into the language of the original providing application in order to avoid difficulty in locating data contained within the irregular table.

At step 540 the grid structure 375 is output to allow a consuming application to draw the irregular sized table and/or locate data contained in the irregular table. For example, if a spreadsheet application requires the data entry contained in Cell G of the table 300 illustrated in FIG. 3, the spreadsheet application may locate the data for that Cell at grid cell 1, 4 of the grid structure 375 when that structure is superimposed over the irregular table 300. For another example, at step 545, the document containing the irregular table is transformed from XML to HTML using an XSLT transform file so that the document may be displayed as originally created using a web browser. At step 555, the consuming application, such as the web browser, uses the grid structure and coordinate system to display the table and address the contents of the table. The method ends at step 590.

As described herein, a method and system are provided for calculating a coordinate system based on a grid structure for superimposing on to an irregular table for allowing a consuming application to define the table shape and to locate data contained within the irregular table. It will be apparent to those skilled in the art that various modifications or variations may be made in the present invention without departing from the scope or spirit of the invention. Other embodiments of the invention will be apparent to those skilled in the art from consideration of this specification and practice of the invention disclosed herein.

We claim:

1. A computer-implemented method of creating a coordinate system for defining an irregular computer-generated table, comprising:
   storing in computer memory a document containing an irregular table having a plurality of table cells;
   determining a size of a smallest table cell;
   creating a grid structure comprised of uniformly-shaped cells in response to the size of the smallest table cell, comprising locating all vertical and horizontal edges of each of the plurality of table cells, marking the position of each cell edge relative to a starting position on the table, and determining a grid cell size that is equal to the smallest table cell;
   preparing a coordinate system for the table for allowing a consuming application to display the shape of the table;
   superimposing the grid structure onto the table;
   defining the shape of the table based on the coordinates of the uniformly-shaped grid cells of the grid structure superimposed onto the table;
   mapping an irregular table cell having a first size with a grid cell having a second size, wherein the first size and the second size are different sizes; and
   storing the defined table using a first markup language.

2. The method of claim 1, whereby the step of defining the shape of the table based on the coordinates of the uniformly-shaped grid cells of the grid structure superimposed onto the table includes:
   mapping each table cell to a position in the grid structure by locating the leftmost and uppermost position of each table cell in the grid structure; and
   defining the size of each table cell based on the number of grid cells high and wide each table cell comprises.

3. The method of claim 1, further comprising:
   transforming the document and the table for display by a consuming application; and
   displaying the document and the table.

4. The method of claim 3, wherein the document is transformed from the first markup language into Hypertext Markup Language (HTML) using an XSLT transform file, wherein the first markup language is different from HTML.

5. The method of claim 4, whereby the step of preparing a coordinate system for the table for allowing a consuming application to define the shape of the table further comprises preparing a coordinate system for the table for allowing the consuming application to locate data contained in the table.

6. The method of claim 5, further comprising:
   locating any data contained in each of the plurality of table cells based on the coordinates of the uniformly-shaped cells of the grid structure overlaying each of the plurality of table cells.

7. The method of claim 6, further comprising the step of:
   in response to locating any data contained in each of the plurality of table cells, causing the consuming application to extract data from one or more of the non-uniformly-shaped cells for use by the consuming application.

8. The method of claim 7, whereby the any data contained in each of the plurality of table cells includes text, graphical images, or alpha-numeric data.

9. The method of claim 1, whereby the consuming application is a web browser application.

10. A computer readable medium having stored thereon computer-executable instructions which when executed by a computer perform:
    preparing a document containing an irregular table having a plurality of table cells;
    determining a size of a smallest table cell;
    creating a grid structure comprised of uniformly-shaped cells in response to the size of the smallest table cell, comprising locating all vertical and horizontal edges of each of the plurality of table cells, marking the position of each table cell edge relative to a starting position at the upper most and left most point on the table, and calculating the smallest cell in the table;
    preparing a coordinate system for the table for allowing a consuming application to display the shape of the table;
    superimposing the grid structure onto the table;
    defining the shape of the table based on the coordinates of the uniformly-shaped grid cells of the grid structure superimposed onto the table;
    mapping an irregular table cell having a first size with a grid cell having a second size, wherein the first size and the second size are different sizes; and
    storing the defined table using a first markup language.

11. The computer readable medium of claim 10, whereby defining the shape of the table based on the coordinates of the uniformly-shaped grid cells of the grid structure superimposed onto the table includes defining the shape of the table and addressing the location of each of a plurality of cells of the table.

12. The computer readable medium of claim 11 having stored thereon computer-executable instructions which when executed by a computer, further perform:

locating any data contained in each of the plurality of table cells based on the coordinates of the uniformly-shaped cells of the grid structure superimposed over each of the plurality of table cells.

13. A computer-implemented method of locating data in an irregular table, comprising:

storing the irregular table in a computer memory;

preparing a coordinate system for the table for allowing a consuming application to display the table;

determining a size of a smallest table cell;

creating a grid structure comprised of uniformly-shaped cells in response to the size of the smallest table cell, comprising locating all vertical and horizontal edges of each of the plurality of table cells, marking the position of each cell edge relative to a starting position on the table, and determining a grid cell size that is equal to the smallest table cell;

applying the coordinate system to the table;

defining the shape of the table based on a set up of coordinates of the coordinate system that define an outer parameter of the table;

mapping an irregular table cell having a first size with a grid cell having a second size, wherein the first size and the second size are different sizes;

locating data contained in any of a plurality of cells contained in the table based on a set of coordinates of the coordinate system that define the locations of each of the plurality of cells; and storing the located data as a markup language.

14. The method of claim 13, whereby the step of defining the shape of the table includes:

overlaying the table with the grid structure; and defining the shape of the table based on the coordinates of the uniformly-shaped cells of the grid structure overlaying the table.

15. The method of claim 14, whereby the step of locating data contained in any of a plurality of cells contained in the table based on a set of coordinates of the coordinate system that define the locations of each of the plurality of cells, includes locating any data contained in each of the plurality of cells based on the coordinates of the uniformly-shaped cells of the grid structure overlaying each of the plurality of cells of the table.

* * * * *